(12) United States Patent
Charette et al.

(10) Patent No.: US 11,318,373 B2
(45) Date of Patent: May 3, 2022

(54) NATURAL SPEECH DATA GENERATION SYSTEMS AND METHODS

(71) Applicant: Ford Global Technologies, LLC, Dearborn, MI (US)

(72) Inventors: Francois Charette, Dearborn, MI (US); Lakshmi Krishnan, Dearborn, MI (US); Shant Tokatyan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 16/650,160

(22) PCT Filed: Oct. 4, 2017

(86) PCT No.: PCT/US2017/055170
§ 371 (c)(1),
(2) Date: Mar. 24, 2020

(87) PCT Pub. No.: WO2019/070254
PCT Pub. Date: Apr. 11, 2019

(65) Prior Publication Data
US 2021/0197074 A1    Jul. 1, 2021

(51) Int. Cl.
*A63F 13/215* (2014.01)
*A63F 13/533* (2014.01)
*A63F 13/54* (2014.01)
*A63F 13/87* (2014.01)
*G10L 15/22* (2006.01)

(52) U.S. Cl.
CPC .......... *A63F 13/215* (2014.09); *A63F 13/533* (2014.09); *A63F 13/54* (2014.09); *A63F 13/87* (2014.09); *G10L 15/22* (2013.01)

(58) Field of Classification Search
CPC ...... A63F 13/215; A63F 13/533; A63F 13/54; A63F 13/87; G10L 15/22
See application file for complete search history.

(56) References Cited

U.S. PATENT DOCUMENTS

| | | | |
|---|---|---|---|
| 9,116,880 B2* | 8/2015 | Dolan | G06F 40/40 |
| 10,576,380 B1* | 3/2020 | Beltran | A63F 13/67 |
| 2006/0040718 A1* | 2/2006 | Davis | A63F 13/10 463/9 |
| 2009/0017887 A1* | 1/2009 | Montocchio | A63F 3/00 463/9 |

(Continued)

OTHER PUBLICATIONS

International Search Report of the International Searching Authority for PCT/US2017/055170 dated Jan. 2, 2018.

*Primary Examiner* — Thomas J Hong
*Assistant Examiner* — Carl V Larsen
(74) *Attorney, Agent, or Firm* — Brandon Hicks; Eversheds Sutherland (US) LLP

(57) ABSTRACT

Example natural speech data generation systems and methods are described. In one implementation, a natural speech data generator initiates a game between a first player and a second player and determines a scenario associated with the game. A first role is assigned to the first player and a second role is assigned to the second player. The natural speech data generator receives multiple natural speech utterances by the first player and the second player during the game.

20 Claims, 6 Drawing Sheets

(56) References Cited

U.S. PATENT DOCUMENTS

| | | | |
|---|---|---|---|
| 2009/0075732 A1* | 3/2009 | Sanders | A63F 1/04 463/31 |
| 2012/0109623 A1* | 5/2012 | Dolan | G06F 40/45 704/2 |
| 2014/0170613 A1* | 6/2014 | Jensson | G09B 19/06 434/157 |
| 2016/0275952 A1* | 9/2016 | Kashtan | G10L 17/22 |
| 2018/0240352 A1* | 8/2018 | Thomas | G09B 7/02 |

* cited by examiner

Scenario Details for Passenger

It's 7:30am on a weekday. You are leaving your home and taking an autonomous taxi (or ride sharing service) to work. When the taxi arrives at your home, you get into the taxi and start talking with the system operating the taxi. Talk with the taxi using a normal conversation.

FIG. 5A

Scenario Details for Autonomous Vehicle

It's 7:30am on a weekday. You receive a request to pick up a passenger at 123 Main Street. When you arrive at the pick-up location, the passenger is waiting and gets into your vehicle. Talk with the passenger using a normal conversation.

FIG. 5B

NATURAL SPEECH DATA GENERATION SYSTEMS AND METHODS

TECHNICAL FIELD

The present disclosure relates to systems and methods that collect unscripted natural speech utterances.

BACKGROUND

Natural speech dialogue utterances are useful for training a neural network to understand conversations and other interactions. Existing methods for collecting data associated with natural speech includes individual users reading scripted textual passages. However, these approaches that use scripted text are not natural and do not necessarily represent natural speech dialogue in an actual, spontaneous situation. Training a neural network with speech utterances related to scripted text may not effectively analyze or process actual speech dialogue in an actual conversational situation.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 5A and 5B illustrate example player roles and instructions associated with a particular game scenario.

DETAILED DESCRIPTION

Figure 1:
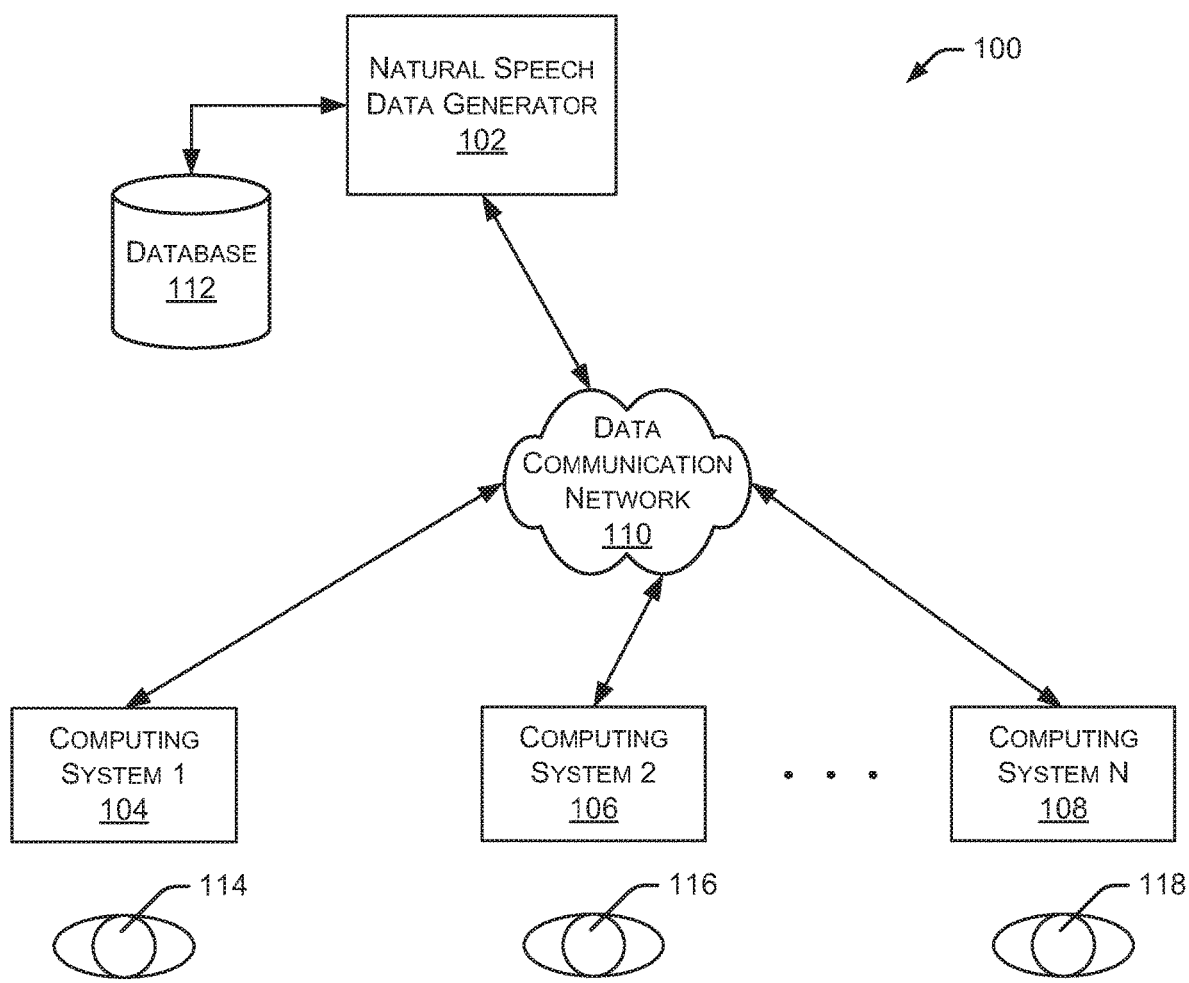
FIG. 1 is a block diagram depicting an environment within which an example embodiment may be implemented.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram depicting an environment 100 within which an example embodiment may be implemented. As shown in FIG. 1, a natural speech data generator 102 and multiple computing systems 104, 106, and 108 are coupled to a data communication network 110. As discussed herein, natural speech data generator 102 collects unscripted natural speech utterances from one or more computing systems 104-108. The unscripted natural speech utterances are obtained from a natural dialogue between two or more users having a conversation as part of a gaming environment. During a game, the users (i.e., players) speak naturally to accomplish a task as they would during a normal conversation. In some embodiments, natural speech data generator 102 stores data associated with the collected unscripted natural speech utterances in a database 112. Additionally, other types of data and information may be stored in database 112 by natural speech data generator 102 or other systems. In some embodiments, natural speech data generator 102 is implemented in a server or other computing device (or combination of computing devices) capable of communicating with computing systems 104-108 via data communication network 110.

Data communication network 110 includes any type of network topology using any communication protocol. Additionally, data communication network 110 may include a combination of two or more communication networks. In some embodiments, data communication network 110 includes a cellular communication network, the Internet, a local area network, a wide area network, or any other communication network. Computing systems 104-108 may include any type of computing device, such as a desktop computer, a laptop computer, a mobile device, a microprocessor-based or programmable consumer electronic device, a network PC, a minicomputer, a mainframe computer, a PDA, a smartphone, a game console, a tablet, and the like. As discussed herein, users interact with a particular computing system 104-108 during a game or other conversational situation. In the example of FIG. 1, a first user 114 interacts with computing system 104, a second user 116 interacts with computing system 106, and a third user 118 interacts with computing system 108. Although three computing systems 104-108 and three users 114-118 are shown in FIG. 1, alternate embodiments may include any number of computing systems and any number of users interacting with the computing systems.

In some embodiments, natural speech data generator 102 and computing systems 104-108 are each located in a different geographic location. For example, natural speech data generator 102 may be located at a first geographic location associated with a business and each computing system 104-108 is located at a different geographic location associated with a user's current location. In other embodiments, computing systems 104-108 may be located in the same geographic location, such as the same building, campus, and the like. In particular implementations, natural speech data generator 102 and computing systems 104-108 are located in the same geographic location or a similar geographic area.

In some embodiments, the game between multiple players is facilitated via a web site or other online server or service (not shown). In these embodiments, the web site or other server/service may be coupled to data communication network 110 to communicate with natural speech data generator 102 and computing systems 104-108. In other embodiments, the game between multiple players is facilitated by natural speech data generator 102 or other system coupled to natural speech data generator 102.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
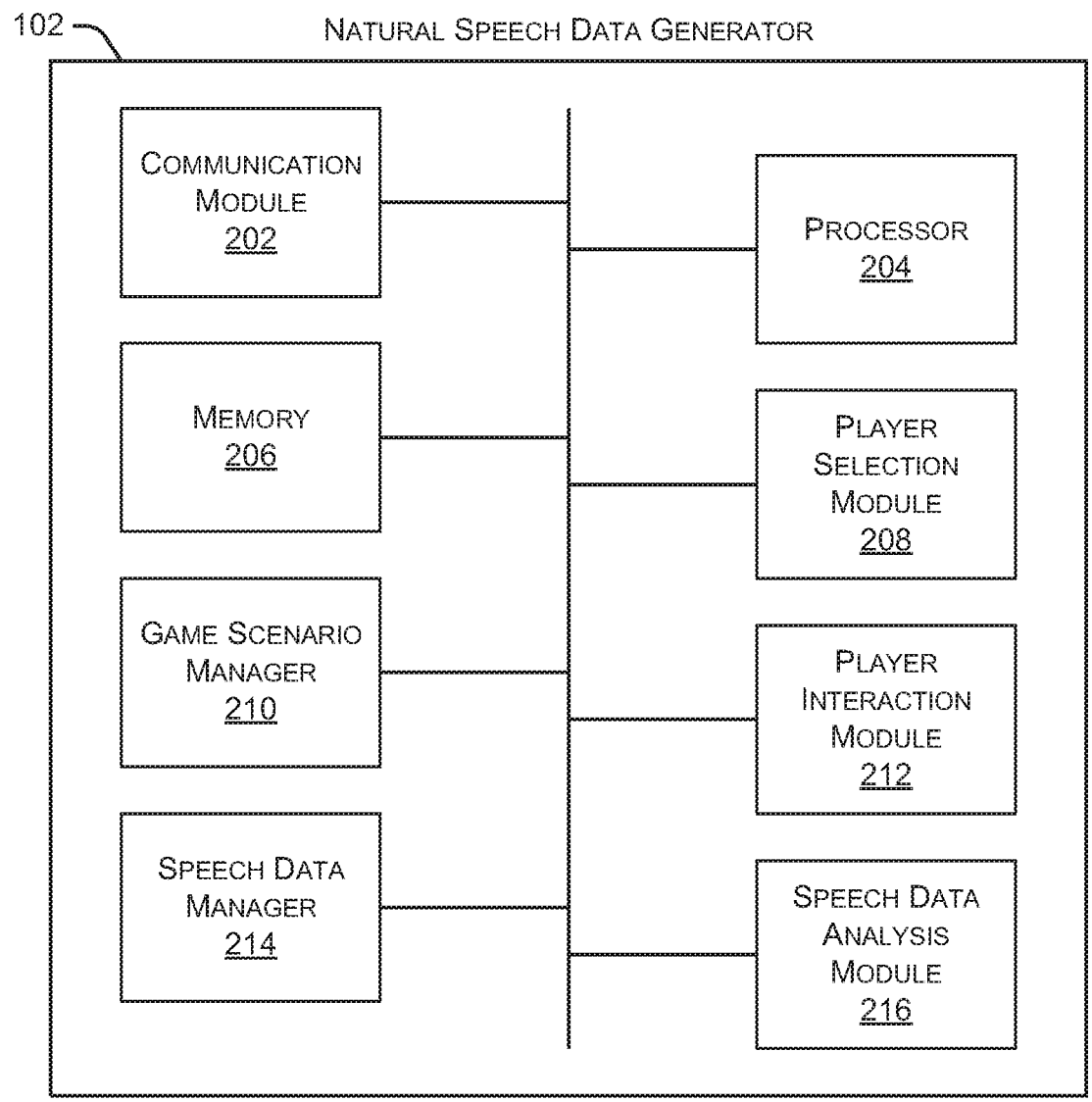
FIG. 2 is a block diagram illustrating an embodiment of a natural speech data generator.

FIG. 2 is a block diagram illustrating an embodiment of natural speech data generator 102. As shown in FIG. 2, natural speech data generator 102 includes a communication module 202, a processor 204, and a memory 206. Communication module 202 allows natural speech data generator 102 to communicate with other systems, such as computing systems 104-108, database 112, and the like. Processor 204 executes various instructions to implement the functionality provided by natural speech data generator 102, as discussed herein. Memory 206 stores these instructions as well as other data used by processor 204 and other modules and components contained in natural speech data generator 102.

Additionally, natural speech data generator 102 includes a player selection module 208 that selects or identifies two or more players to participate in a particular game. In some embodiments, players are selected randomly from any population that represents a potential customer or client associated with the game. For example, if the particular game is associated with a ride sharing service, players are selected from any population of potential players that are interested in using ride sharing services. In this example, players that do not want to use ride sharing services would not be selected for the particular game. In some embodiments, a database or pool of existing players is maintained along with information regarding the interests, preferences, and the like for each player.

A game scenario manager 210 manages various scenarios implemented in any number of games. In some embodiments, the same scenario is implemented in multiple games (with multiple different players) to get a variety of natural speech utterances from the different players, thereby generating a more comprehensive set of data representing different types of conversations associated with a particular scenario. In other embodiments, the same players are identified to participate in a variety of different scenarios, which allows natural speech data generator 102 to collect data from the same players in different scenarios (e.g., different situations). In some embodiments, the same player may be selected for a variety of different games that implement different scenarios.

Natural speech data generator 102 also includes a game scenario manager 210 that manages multiple game scenarios implemented with any number of players. As discussed herein, each scenario represents an example situation and each player is assigned a role in the scenario. Each scenario describes details of the example situation and provides instructions for each player regarding their role and how they should (or should not) interact during the game. Typical instructions include asking the players to talk and communicate using a normal conversation.

A player interaction module 212 manages interactions between multiple players and interactions between natural speech data generator 102 and one or more players. For example, player interaction module 212 may communicate instructions to players, receive natural speech utterances by the players as the game is played, and send/receive data to one or more computing systems or other devices. A speech data manager 214 receives, organizes, and stores data associated by natural speech utterances by the players. In some embodiments, natural speech data generator 102 creates tags and/or metadata and associates the tags or metadata with speech utterances. The tags and metadata include, for example, the context in which the speech utterance was captured, such as the game being played, the particular scenario being implemented, the role of the player who made the utterance, and the like. In some embodiments, the tags or metadata are generated automatically by natural speech data generator 102 as the speech utterances are captured or received by natural speech data generator 102. In some implementations, the speech utterances may be transcribed into text. In these implementations, the original tags or metadata are associated with the transcribed text. Additional tags or metadata may also be associated with the transcribed text based on the specific words in the text, such as keywords or commonly used phrases.

Natural speech data generator 102 also includes a speech data analysis module 216 that analyzes speech data such as natural speech utterances by players during a game. In some embodiments, the analysis of the speech data is at least partially based on the scenario during which the natural speech utterances were received. For example, speech data analysis may include transcription of the speech utterances, identification of a speaker who spoke a particular utterance, removing noise (e.g., static or background noise) from the speech utterances, and the like.

In some embodiments, multiple databases 112 are used to store information associated with different scenarios. For example, is a specific scenario includes a passenger's conversation with an autonomous vehicle, all games implementing that scenario (i.e., multiple sets of players playing the same scenario) are stored in the same database. Thus, the specific database stores conversations and natural speech data associated with that particular type of situation. As discussed herein, the same scenario is played multiple times with multiple different players to generate a large data set of natural speech data associated with the scenario. The collected data is used, for example, to train a neural network.

Figure 3:
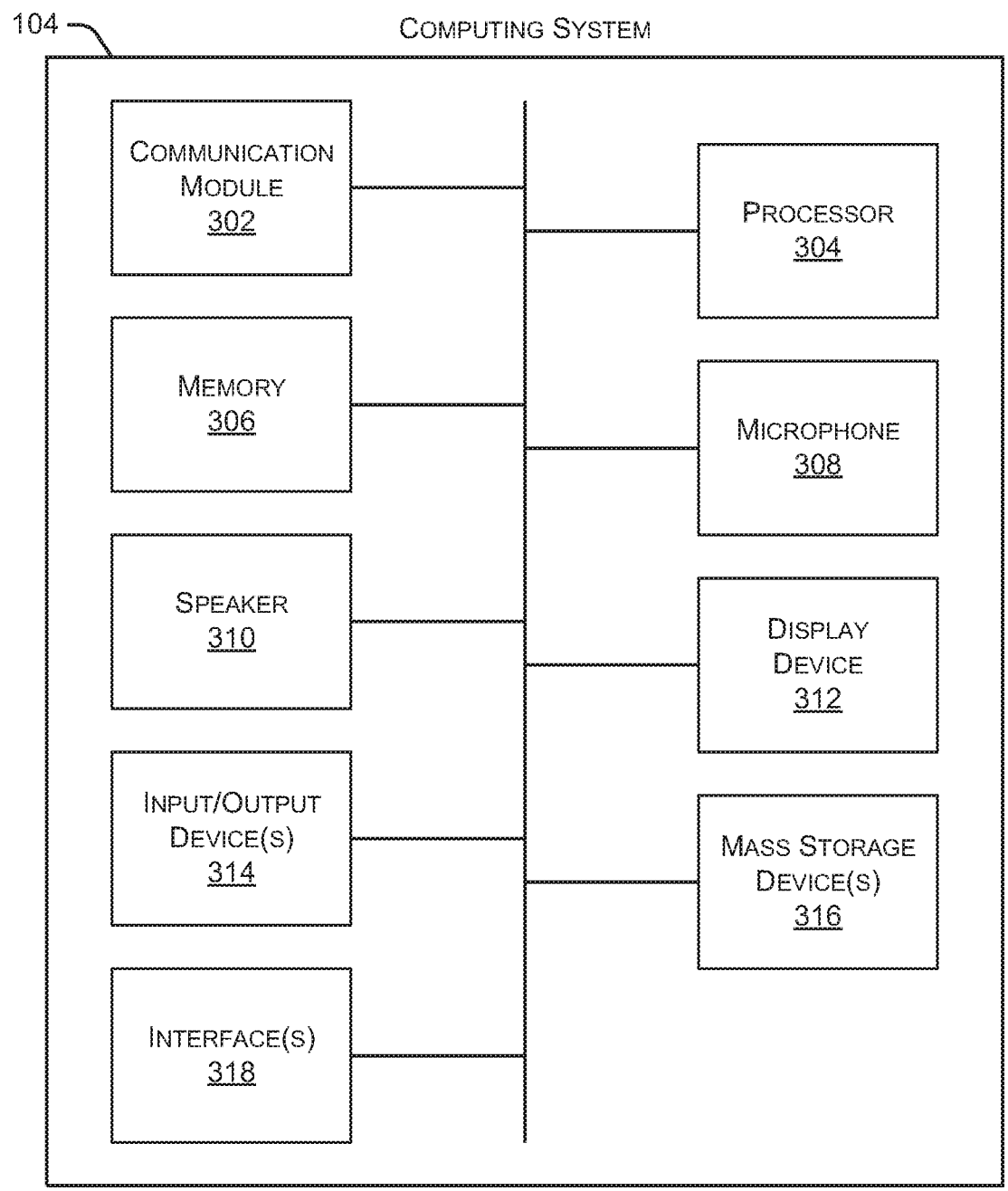
FIG. 3 is a block diagram illustrating an embodiment of a computing system.

FIG. 3 is a block diagram illustrating an embodiment of computing system 104. Similar components and devices may be included in computing systems 106, 108 as well as any other computing systems, devices, or servers discussed herein. As shown in FIG. 3, computing system 104 includes a communication module 302, a processor 304, and a memory 306. Communication module 302 allows computing system 104 to communicate with other systems, such as natural speech data generator 102, computing systems 106, 108, and the like. In some embodiments, communication module 302 may support multiple communication systems and multiple communication protocols. Processor 304 executes various instructions to implement the functionality provided by computing system 104, as discussed herein. Memory 306 stores these instructions as well as other data used by processor 304 and other modules and components contained in computing system 104.

A microphone 308 captures spoken words and utterances by a user of computing system 104, such as a game player. The captured words, utterances, and other audio data may be communicated to natural speech data generator 102. A speaker 310 provides audio instructions, music, sound effects, and other audio data to the user of computing system 104. The instructions, music, sound effects, and other audio data may be associated with a game being played by the user of computing system 104. A display device 312 presents visual information to a user of computing system 104, such as visual information and graphics associated with a game being played by the user of computing system 104.

One or more input/output devices 314 allow data and/or other information to be input to or received from computing system 104. Example input/output devices 314 include cursor control devices, keyboards, keypads, touch screens, printers, network interface cards, modems, lenses, CCDs or other image capture devices, and the like. One or more mass storage devices 316 include various computer-readable media, such as magnetic tapes, magnetic disks, optical disks, solid state memory (e.g., Flash memory), and the like. Various drives may also be included in mass storage devices 316 to enable reading from and/or writing to various computer readable media. Mass storage devices 316 include removable media and/or non-removable media.

Computing system 104 also includes one or more interfaces 318 that allow computing system 104 to interact with other systems, devices, or computing environments. Example interfaces 318 include any number of different network interfaces, such as interfaces to local area networks (LANs), wide area networks (WANs), wireless networks, and the Internet.

Figure 4:
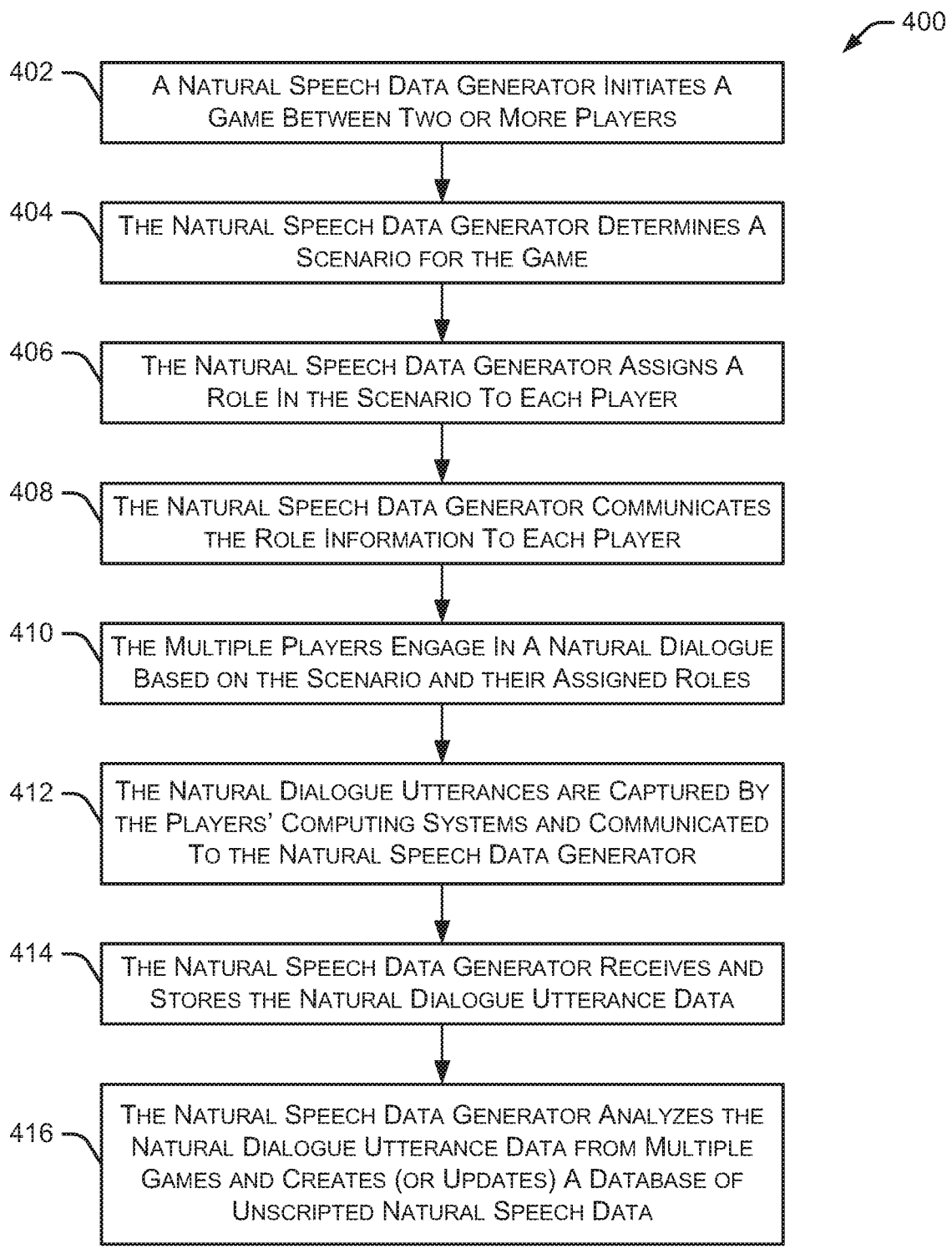
FIG. 4 is a flow diagram illustrating an embodiment of a method for implementing a multi-player game to collect natural speech data.

FIG. 4 is a flow diagram illustrating an embodiment of a method 400 for implementing a multi-player game to collect natural speech data. Method 400 starts as a natural speech data generator initiates 402 a game between two or more players. In some embodiments, the game is a video game that displays information associated with the scenario or environment. In particular examples, the game is implemented using virtual reality or augmented reality to provide a more immersive gaming experience. In other embodiments, the game may be implemented using just audio interaction (i.e., not requiring any video data or video images). The natural speech data generator then determines 404 a scenario for the game. As discussed herein, a scenario describes details of an example situation (or environment) in which the game is operating. For example, a scenario may include a passenger taking an autonomous taxi (or autonomous ride sharing service) to work, the grocery store, or other location.

Method 400 continues as the natural speech data generator assigns 406 a role in the scenario to each player. As discussed herein, each scenario represents an example situation and each player is assigned a role in the scenario. In the example scenario mentioned above, one player may be assigned the role of the passenger and another player may be assigned the role of the autonomous vehicle, such as the voice interaction system associated with the autonomous vehicle. Although particular examples discussed herein refer to games that involve two players, alternate embodiments may include any number of players. For example, in an autonomous ride sharing scenario with two passengers, a first player acts as a first passenger, a second player acts as a second passenger, and a third player acts as an autonomous vehicle. The natural speech data generator communicates 408 the role information to each player. For example, the role information may be a portion of the overall scenario where the role information focuses on the specific role (or activity) the player represents (or "plays") during the game.

Method 400 continues as the multiple players engage 410 in a natural dialogue based on the scenario and their assigned roles. An example dialogue is discussed below with respect to FIG. 6. The natural dialogue utterances are captured 412 by each player's computing system and communicated to the natural speech data generator, which receives 414 and stores the natural dialogue utterance data for future reference. The natural speech data generator then analyzes 416 the natural dialogue utterance data from multiple games and creates (or updates) a database of unscripted natural speech data.

FIGS. 5A and 5B illustrate example player roles and instructions associated with a particular game scenario. In this scenario, a passenger is leaving their home at 7:30 am on a weekday and taking an autonomous taxi (or autonomous ride sharing service) to work. As shown in FIG. 5A, scenario details for the passenger are provided to a first player who is acting as the passenger. The instructions to the first player ask the player to get into the taxi and start talking with the system operating the taxi in a normal conversation. As shown in FIG. 5B, scenario details for the autonomous vehicle are provided to a second player who is acting as the autonomous vehicle. The instructions to the second player ask the player to pick up the passenger and, after the passenger gets into the vehicle, talk with the passenger in a normal conversation. In some embodiments, the appropriate player roles and instructions are presented to each player on their computing system. For example, the player acting as the passenger only sees details of the scenario related to the passenger role on their computing system's display screen. Similarly, the player acting as the autonomous vehicle only sees details of the scenario related to the autonomous vehicle role on their computing system's display screen. Other example scenarios include a first player acting as a tour guide for a second player, a first player asking for directions to a particular location from a second player (who may be acting as an individual person or an autonomous vehicle), a first player asking for a recommendation for a restaurant, etc. from a second player (acting as an individual person or an autonomous vehicle), and the like.

Figure 6:
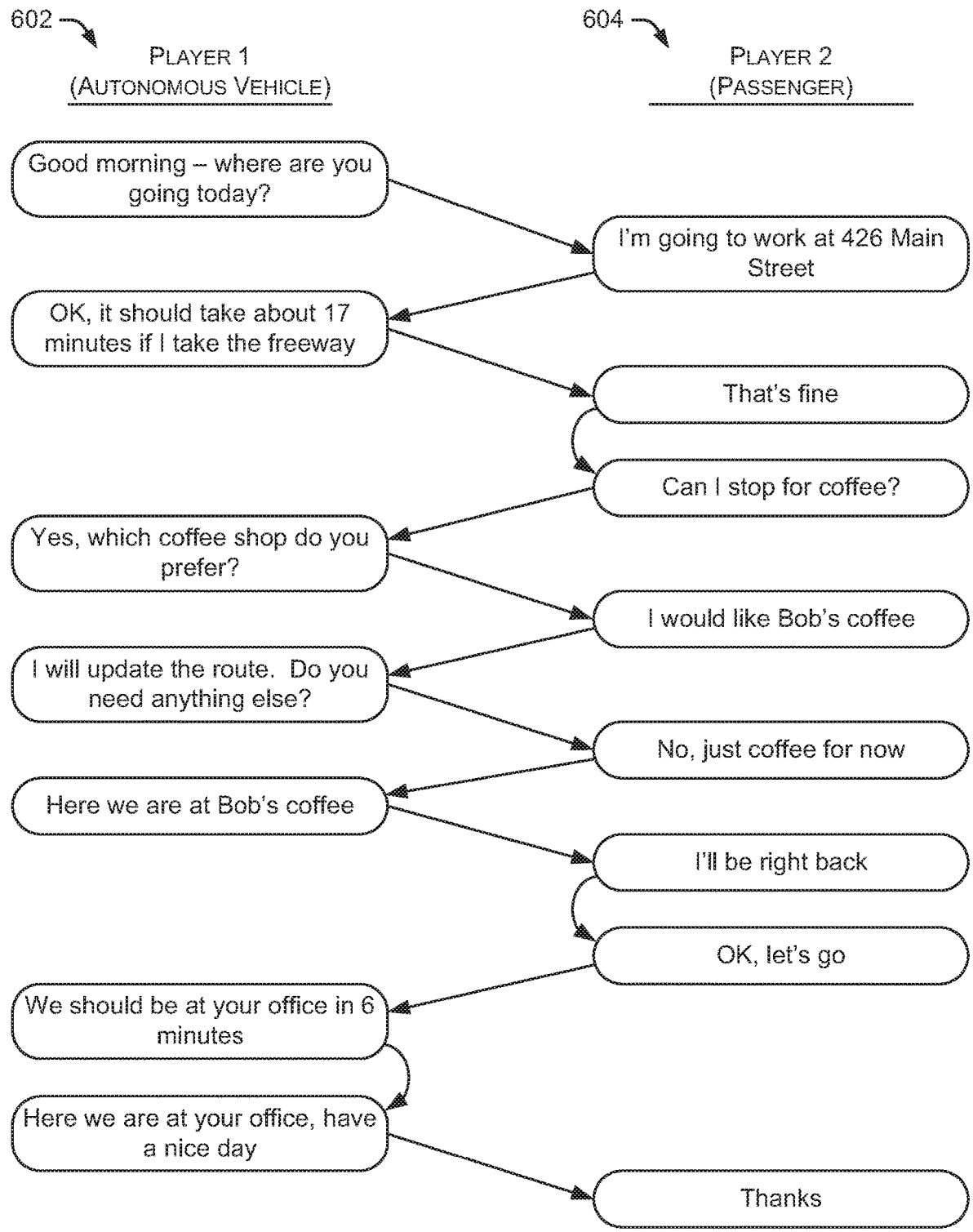
FIG. 6 is a flow diagram illustrating an embodiment of a natural dialogue between two players executing a game scenario.

FIG. 6 is a flow diagram illustrating an embodiment of a natural dialogue between two players executing a game scenario. A column 602 on the left side of FIG. 6 represents the spoken utterances of a player acting as the autonomous vehicle. A column 604 on the right side of FIG. 6 represents the spoken utterances of a different player acting as the passenger. The spoken utterances are in chronological order starting with the oldest utterances at the top of FIG. 6 and the most recent utterances at the bottom of FIG. 6. In the example of FIG. 6, the spoken utterances are not scripted and the content of the conversation is not provided to the players ahead of time. Instead, the players start a natural conversation based on the situation and instructions provided in the scenario and their specific role. The conversation then proceeds naturally as it would in a real situation.

Different sets of players in different games may have very different spoken utterances. For example, in FIG. 6, the player acting as the passenger asks the autonomous vehicle to stop for coffee. In other games, with different players, the player acting as the passenger might not ask to stop for coffee. However, in another game, the player acting as the passenger may ask about traffic conditions, the weather forecast, or who won the baseball game the previous evening. Thus, every game can generate a different series of spoken utterances because the conversations are not scripted and are allowed to occur naturally.

In some embodiments, players are given incentives to participate in the games described herein. The incentives may include, for example, small gifts, credits (or points) toward a gift card, and the like.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   initiating a game between a first player and a second player;
   determining, by a natural speech data generator, a first scenario associated with the game;
   assigning, by the natural speech data generator, a first role to the first player and a second role to the second player;
   receiving, by the natural speech data generator, a plurality of unscripted natural speech utterances by the first player and the second player;
   associating metadata with each unscripted natural speech utterance;
   storing each unscripted natural speech utterance and the associated metadata; and
   training a neural network using data associated with the received unscripted natural speech utterances and the metadata.

2. The method of claim 1, further comprising storing data associated with the unscripted natural speech utterances.

3. The method of claim 1, wherein the first player participates in the game using a first computing system and the second player participates in the game using a second computing system, and wherein the first player and the second player communicate verbally during the game.

4. The method of claim 1, further comprising determining the first role and the second role based on the scenario associated with the game.

5. The method of claim 1, further comprising:
communicating the first role to the first player; and
communicating the second role to the second player.

6. The method of claim 1, wherein the plurality of unscripted natural speech utterances by the first player and the second player are associated with a natural dialogue between the first player and the second player while performing their respective roles.

7. The method of claim 1, further comprising analyzing, by the natural speech data generator, data associated with the unscripted natural speech utterances.

8. The method of claim 7, wherein analyzing the data associated with the unscripted natural speech utterances includes analyzing data associated with unscripted natural speech utterances generated during a plurality of games played by a plurality of players.

9. The method of claim 1, wherein the metadata includes at least one of an identity of a player who spoke the unscripted natural speech utterance, a role of the player who spoke the unscripted natural speech utterance, and a scenario being implemented.

10. The method of claim 1, wherein the first role and the second role include relevant portions of the scenario for each player, and wherein the first role and the second role include instructions to communicate using a normal conversation.

11. The method of claim 1, wherein the first role is a passenger in an autonomous vehicle and the second role is an autonomous vehicle.

12. The method of claim 1, further comprising:
initiating a second game between the first player and the second player;
determining, by a natural speech data generator, a second scenario associated with the game, wherein the second scenario is a different type of scenario than the first scenario;
assigning, by the natural speech data generator, a third role to the first player and a fourth role to the second player;
receiving, by the natural speech data generator, a second plurality of unscripted natural speech utterances by the first player and the second player;
associating second metadata with the second plurality of unscripted natural speech utterances;
storing the second plurality of unscripted natural speech utterances and the associated second metadata; and
training the neural network using data associated with the second plurality of unscripted natural speech utterances and the second metadata.

13. The method of claim 1, further comprising:
initiating a second game between a third player and a fourth player;
determining, by a natural speech data generator, a second scenario associated with the game, wherein the second scenario is a same type of scenario as the first scenario;
assigning, by the natural speech data generator, the first role to the third player and the second role to the fourth player;
receiving, by the natural speech data generator, a second plurality of unscripted natural speech utterances by the third player and the fourth player;
associating second metadata with the second plurality of unscripted natural speech utterances;
storing the second plurality of unscripted natural speech utterances and the associated second metadata; and
training the neural network using data associated with the second plurality of unscripted natural speech utterances and the second metadata.

14. A method comprising:
initiating a game between a first player and a second player;
determining, by a natural speech data generator, a first scenario associated with the game;
assigning, by the natural speech data generator, a first role to the first player, wherein the first role includes relevant portions of the scenario for the first player and includes instructions to communicate with the second player using a normal conversation;
assigning, by the natural speech data generator, a second role to the second player, wherein the second role includes relevant portions of the scenario for the second player and includes instructions to communicate with the first player using a normal conversation;
receiving, by the natural speech data generator, a plurality of unscripted natural speech utterances by the first player and the second player;
associating metadata with each unscripted natural speech utterance;
storing each unscripted natural speech utterance and the associated metadata; and
training a neural network using data associated with the received unscripted natural speech utterances and the metadata.

15. The method of claim 14, wherein the first player participates in the game using a first computing system and the second player participates in the game using a second computing system, and wherein the first player and the second player communicate verbally during the game.

16. The method of claim 14, further comprising determining the first role and the second role based on the scenario associated with the game.

17. The method of claim 14, wherein the plurality of unscripted natural speech utterances by the first player and the second player are associated with a natural dialogue between the first player and the second player while performing their respective roles.

18. The method of claim 14, further comprising analyzing data associated with the unscripted natural speech utterances, wherein the analyzing includes analyzing data associated with natural speech utterances generated during a plurality of games played by a plurality of players.

19. The method of claim 14, wherein the metadata includes at least one of an identity of a player who spoke the unscripted natural speech utterance, a role of the player who spoke the unscripted natural speech utterance, and a scenario being implemented.

20. An apparatus comprising:
a communication manager configured to communicate with a first computing system used by a first player and a second computing system used by a second player;
a game scenario manager configured to assign a scenario to a game played by the first player and the second player;
a player selection module coupled to the game scenario manager and configured to assign a first role to the first player and a second role to the second player, wherein the first role and the second role include relevant portions of the scenario for each player, and wherein the first role and the second role include instructions to communicate using a normal conversation; and a speech data manager configured to:
 receive a plurality of unscripted natural speech utterances by the first player and the second player during the game;
 associate metadata with each unscripted natural speech utterance;
 store each unscripted natural speech utterance and the associated metadata; and
 train a neural network using data associated with the received unscripted natural speech utterances and the metadata.

\* \* \* \* \*